United States Patent
Wozniak

(10) Patent No.: US 7,530,620 B2
(45) Date of Patent: May 12, 2009

(54) COMBINATION HARNESS PROTECTOR AND CARPET

(75) Inventor: David James Wozniak, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 12/110,679

(22) Filed: Apr. 28, 2008

(65) Prior Publication Data

US 2008/0197661 A1 Aug. 21, 2008

Related U.S. Application Data

(63) Continuation of application No. 11/540,022, filed on Sep. 29, 2006, now Pat. No. 7,364,224.

(51) Int. Cl.
*B62D 25/20* (2006.01)
(52) U.S. Cl. ..................... 296/97.23; 296/208
(58) Field of Classification Search .............. 296/97.23, 296/193.07, 208, 97.3, 39.1, 39.3, 204; 297/425.555
See application file for complete search history.

(56) References Cited

U.S. PATENT DOCUMENTS

| | | | | |
|---|---|---|---|---|
| 2,032,832 A * | 3/1936 | Blair et al. | ............... | 180/90.6 |
| 2,619,828 A * | 12/1952 | Wiesmann | ............... | 52/220.4 |
| 2,709,105 A * | 5/1955 | Kramer | ............... | 296/97.23 |
| 3,078,116 A * | 2/1963 | West | ............... | 296/97.23 |
| 3,424,265 A * | 1/1969 | Stata | ............... | 296/97.23 |
| 3,494,657 A | 2/1970 | Tantlinger et al. | | |
| 3,603,048 A | 9/1971 | Hadfield et al. | | |
| 3,630,564 A * | 12/1971 | Ferrara | ............... | 296/208 |
| 3,715,844 A * | 2/1973 | Breading | ............... | 52/220.5 |
| 3,984,621 A * | 10/1976 | Propst | ............... | 174/482 |
| 4,394,714 A * | 7/1983 | Rote | ............... | 362/576 |
| 4,656,798 A | 4/1987 | Hazen | | |
| 4,673,207 A | 6/1987 | Reynolds et al. | | |
| 4,828,898 A * | 5/1989 | Bailey | ............... | 428/88 |
| 4,890,007 A * | 12/1989 | Vu et al. | ............... | 307/118 |
| 5,008,491 A | 4/1991 | Bowman | | |
| 5,052,283 A * | 10/1991 | Altus | ............... | 454/144 |
| 5,082,712 A * | 1/1992 | Starp | ............... | 428/95 |
| 5,178,434 A | 1/1993 | Krebs | | |
| 5,193,879 A | 3/1993 | Chen | | |
| 5,345,736 A * | 9/1994 | Shoenfeld | ............... | 52/220.5 |
| 5,401,905 A * | 3/1995 | Lesser et al. | ............... | 174/99 R |
| 5,419,610 A * | 5/1995 | Enning et al. | ............... | 296/193.07 |
| 5,439,725 A | 8/1995 | Roberts | | |

(Continued)

*Primary Examiner*—Kiran B. Patel
(74) *Attorney, Agent, or Firm*—Young Basile

(57) ABSTRACT

A floor covering product, process, and product by process provides protection for an electrical wiring harness of a motor vehicle routed through a passenger compartment on top of an interior surface of a contoured floor pan area with an adjacent kick plate body area portion extending generally upwardly along at least a portion of the interior contoured floor pan area. An aesthetic floor covering material is adapted to be sufficiently coextensive with the contoured floor pan area to be covered, and a contoured reinforcement member is associated with a portion of the aesthetic floor covering material, such that after installation, the contoured reinforcement member extends generally upwardly from the exposed floor pan area and extends generally towards the adjacent kick plate body area to define a crush resistant open conduit for receiving an electrical wire harness or duct work to be routed therethrough.

14 Claims, 4 Drawing Sheets

U.S. PATENT DOCUMENTS

| | | | |
|---|---|---|---|
| 5,460,530 A * | 10/1995 | Toba et al. ..................... 439/34 |
| 5,501,044 A * | 3/1996 | Janesky ..................... 52/169.5 |
| 5,573,294 A | 11/1996 | Mack |
| 5,620,546 A * | 4/1997 | Reuben ..................... 156/219 |
| 5,876,090 A * | 3/1999 | Kawaguti ................ 296/97.23 |
| 5,877,451 A * | 3/1999 | Zimmerman ............... 174/68.3 |
| 5,965,951 A | 10/1999 | Moore et al. |
| 6,051,789 A * | 4/2000 | Kato ......................... 174/68.3 |
| 6,062,633 A * | 5/2000 | Serizawa ..................... 296/208 |
| 6,092,854 A * | 7/2000 | Campbell ..................... 296/70 |
| 6,383,599 B1 * | 5/2002 | Bell et al. ................ 296/97.23 |
| 6,392,147 B1 | 5/2002 | Hier et al. |
| 6,491,999 B1 * | 12/2002 | Cawthra et al. .......... 296/97.23 |
| 6,537,641 B1 * | 3/2003 | Kroll ........................ 296/97.23 |
| 6,834,913 B2 * | 12/2004 | Reed et al. ................... 296/208 |
| 7,243,987 B1 * | 7/2007 | Lorenzo ..................... 296/208 |
| 2003/0102690 A1 | 6/2003 | Gebreselassie et al. |

\* cited by examiner

COMBINATION HARNESS PROTECTOR AND CARPET

CROSS-REFERENCE TO RELATED APPLICATION

This application is a continuation of U.S. patent application Ser. No. 11/540,022, filed Sep. 29, 2006, which issued as U.S. Pat. No. 7,364,224 on Apr. 29, 2008, the contents of which are incorporated herein in its entirety.

FIELD OF THE INVENTION

The present invention relates to a covering product for protecting an elongated member such as an electrical wiring harness of a vehicle routed through a compartment on top of a sheet metal surface area with an adjacent side sheet metal area extending generally upwardly along at least a portion of the sheet metal surface area, and more particularly to a non-planar reinforcement member associated with the covering in an area adjacent a transition from the sheet metal surface area and the adjacent side wall portion to define an open conduit for the electrical wiring harness to be routed therethrough without requiring a recess to be formed in the sheet metal area.

BACKGROUND

Wiring harnesses typically run through a vehicle in order to connect electrical devices to the electrical system of the vehicle. Wiring harnesses typically are run in a recess formed below the level of the floor pan area in a passenger compartment until a cross member support is encountered. In order to traverse a cross member support in the floor pan area, a hollow conduit is typically provided to protect the wiring harness from loads and crushing. The hollow conduit, and wiring harness passing therethrough, is typically covered with an aesthetic interior covering, such as carpet, that can include a foam layer on the bottom surface of the carpet. If a hollow conduit is not provided, the wiring harness can be damaged by repeated abrasion with the overlying carpet, and crushing loads. To an occupant of the vehicle, the carpet may feel crushable or lumpy, or appear not firmly fitted to the floor in the absence of a hollow conduit for the wiring harness. Conduits typically are sized to be larger than the largest wiring harness to be run through the hollow conduit for the vehicle and particular accessory options selected. Therefore, the typical conduit for a wiring harness is sized for a fully-loaded vehicle, while a base model vehicle may only have a relatively smaller size harness dimension. To protect the wiring harness and provide a firm fit for the overlying carpet, a plastic hollow conduit or planar cover for a recess in the floor pan area is typically used in current vehicles. Various wiring harness protector configurations can be seen in U.S. Pat. Nos. 5,439,725; 5,876,090; 5,965,951; 6,092,854; 6,392,147; 6,491,999; and U.S. Patent Publication Application No. US 2003/0102690.

SUMMARY

A covering product is disclosed that is installable for covering at least a portion of a sheet metal area of a vehicle for routing an elongated member in a vehicle. The product comprises an aesthetic material adapted to be sufficiently coextensive with the sheet metal area to be covered and a contoured reinforcement member associated with and supporting a portion of the aesthetic material. After installation of the reinforcement member, the contoured reinforcement member extends along the sheet metal area beneath the aesthetic material and transitions away from the sheet metal area and toward an adjacent sheet metal side portion to form a crush resistant open conduit. The crush resistant open conduit is defined by the contoured reinforcement member, a portion of the sheet metal area and the adjacent sheet metal side portion in an area adjacent the transition for receiving the elongated member therethrough.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
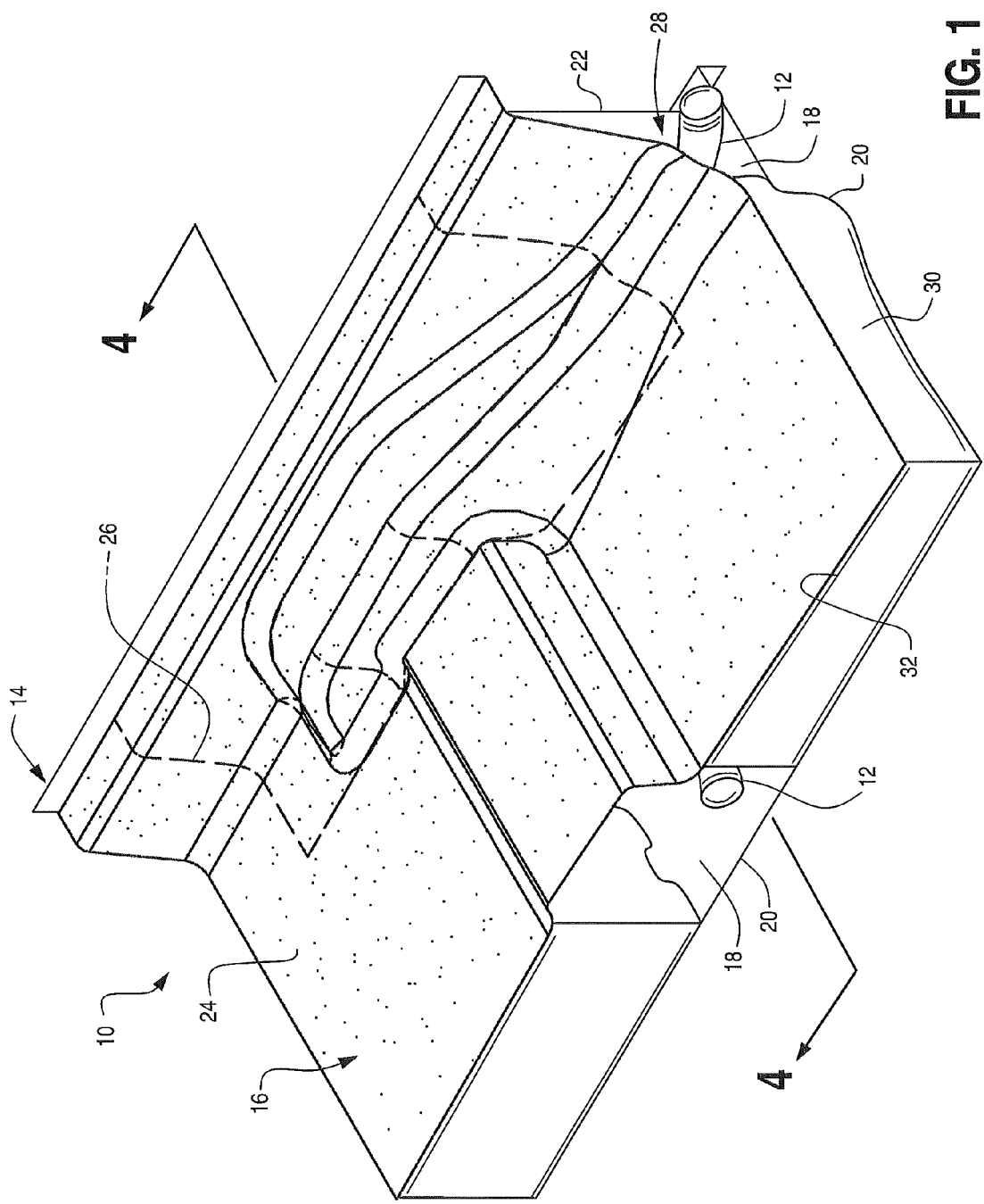
FIG. 1 is a perspective view of a motor vehicle showing an interior floor pan having a floor covering assembly in accordance with an embodiment of the present invention.
Figure 2:
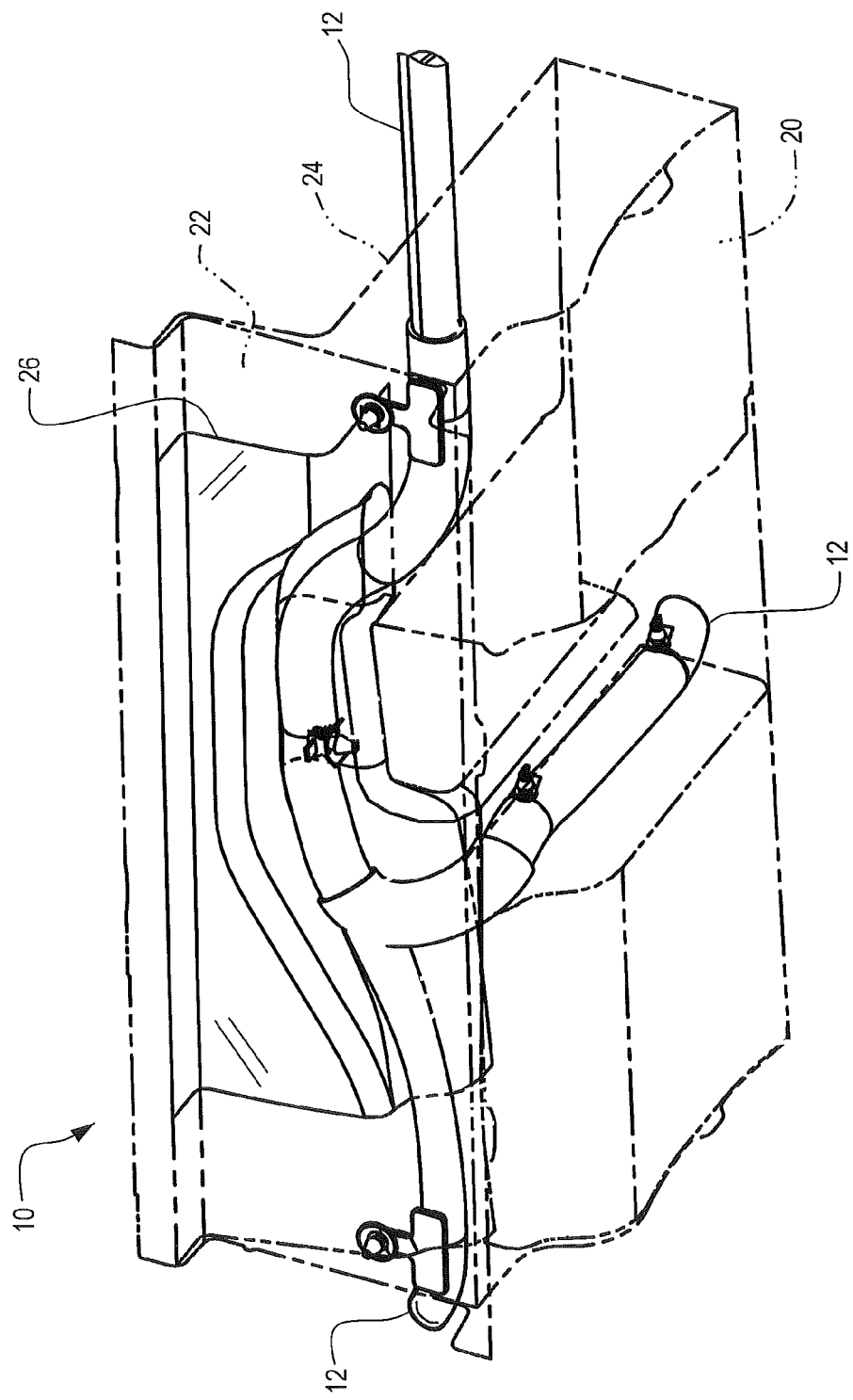
FIG. 2 is a perspective view of an underside of the interior floor pan, with the interior floor pan shown in phantom in order to facilitate illustration of the wiring harness routing through the passenger compartment of the vehicle, and the underside of the floor covering assembly including a non-planar reinforcement member.
Figure 3:
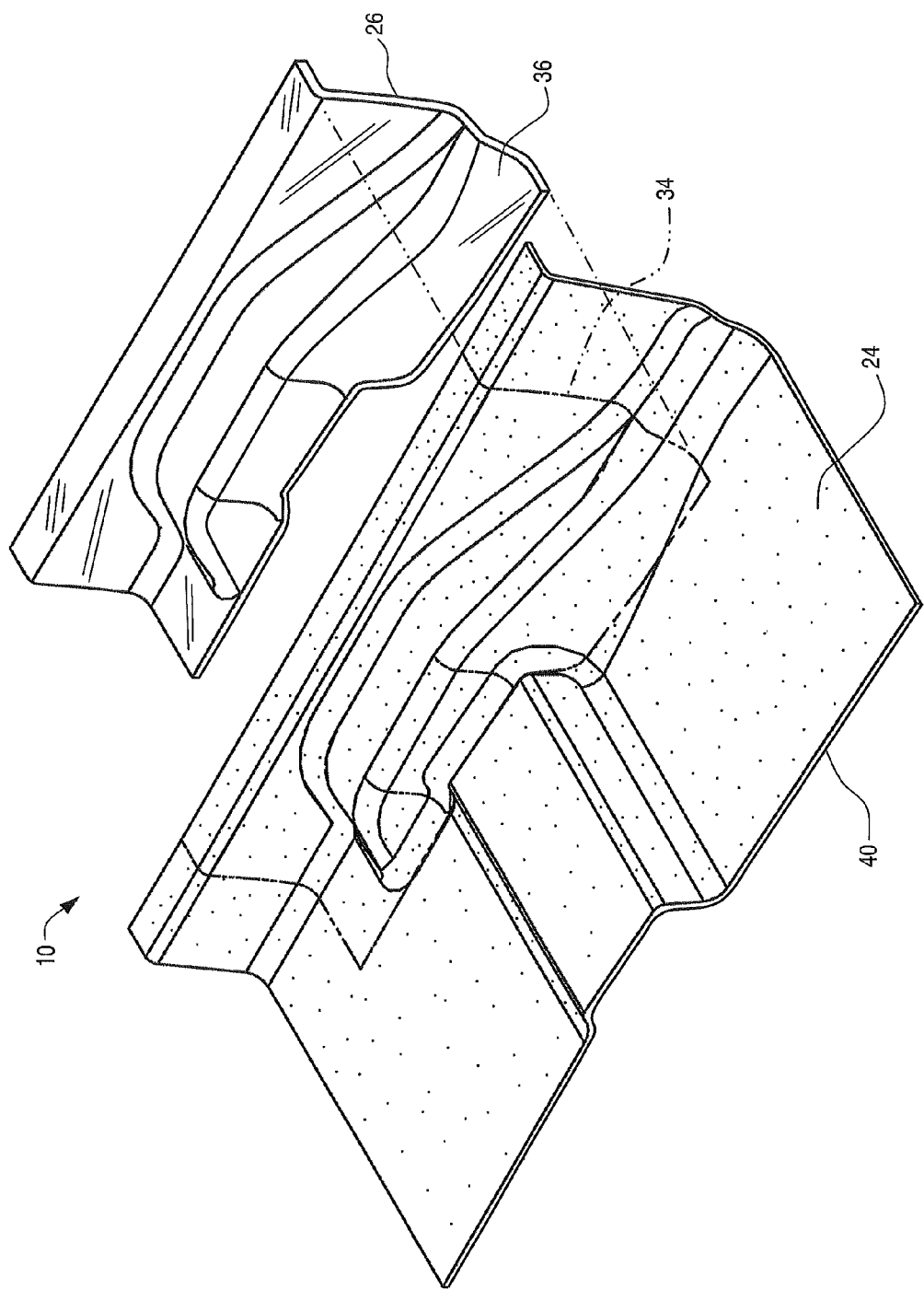
FIG. 3 is a perspective exploded view of a floor covering assembly with the non-planar reinforcement member spaced from its normal position associated with the floor covering.
Figure 4:
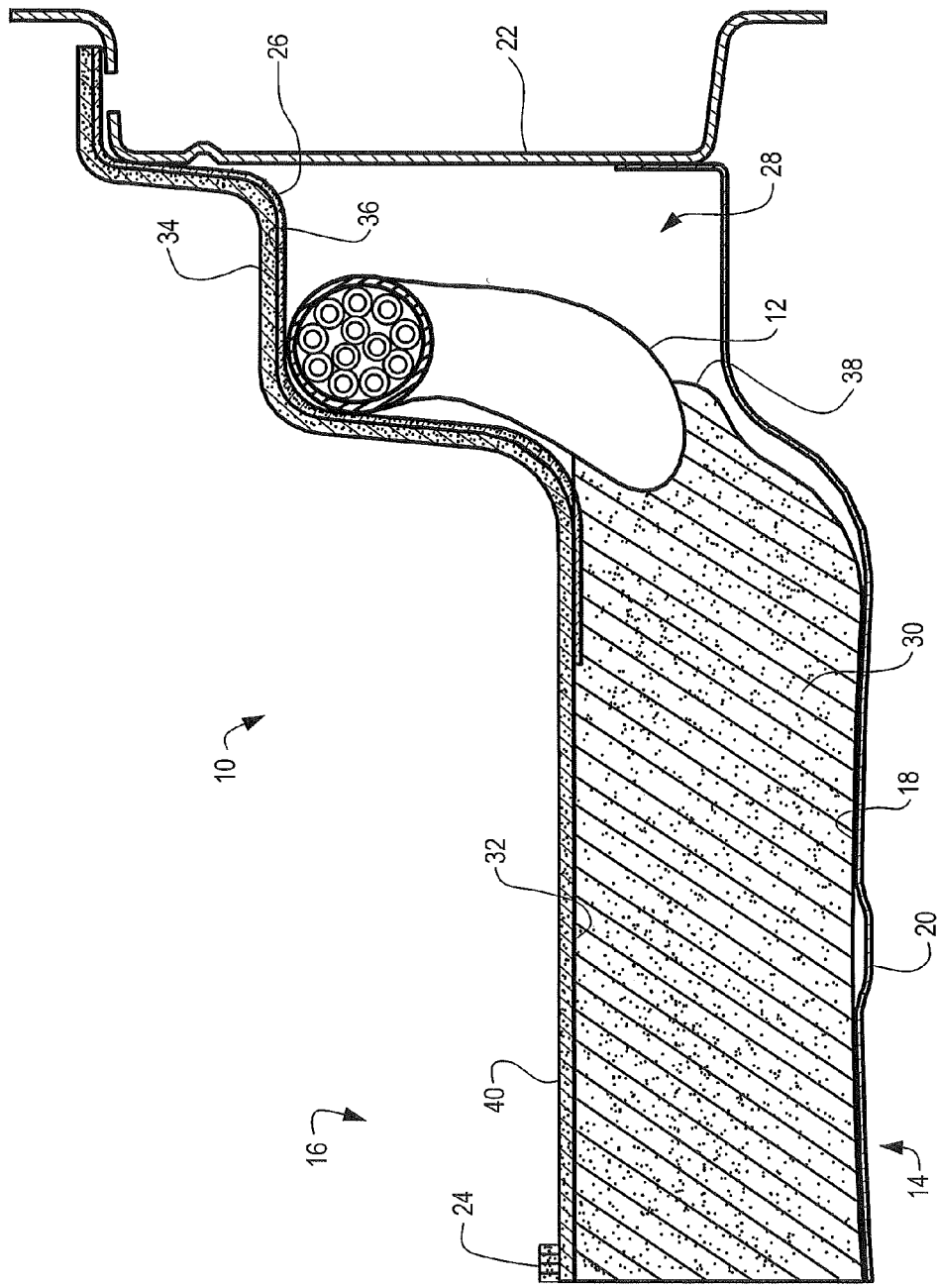
FIG. 4 is a simplified cross-sectional view taken as shown in FIG. 1.

Referring now to FIGS. 1-4, a floor covering assembly or product 10 is illustrated for protecting an elongated passageway 12, shown as an electrical wire harness in this embodiment, of a motor vehicle 14 routed through an interior space 16, such as a trunk or a passenger compartment, on top of an interior surface 18 of a contoured sheet metal or pan area 20 with an adjacent side sheet metal or kick plate body area portion 22 extending generally upwardly along at least a portion of the interior contoured floor pan area 20. No special recess is required to be designed into the floor sheet metal for use as an electrical wiring harness routing path through the interior space 16, such as a trunk or passenger compartment. The floor covering product 10 can include a floor covering 24 made of a material being sufficiently flexible to be coextensive with the interior contoured floor pan area 20 and the adjacent kick plate body area portion 22 to be covered, and a non-planar reinforcement member 26 made of a material being sufficiently stiff to be self supporting and non-crushable under normal loads can be located at a position spaced from the interior contoured floor pan area 20 and the kick plate body area portion 22. The reinforcement member 26 is associated with the floor covering 24 in an area adjacent a transition from the interior contoured floor pan area 20 and the kick plate body area portion 22 to define an open conduit 28 for the electrical wiring harness 12 to be routed therethrough.

A padding material 30 can have a first side 32 engageable with the floor covering 24 and can be less than coextensive with the floor covering 24, such that the padding material 30 defines a portion of the crush resistant open conduit 28 existing between an edge of the padding material 30, the exposed floor pan area 20, and the adjacent kick plate body area portion 22 for receiving an electrical wiring harness 12 to be routed therethrough. The padding material is not coextensive with reinforcement member 26, and can overlap with a portion or none of the area of the reinforcement member 26. The padding material is located between the floor pan area 22 and the floor covering 24, and between no more than a portion of the reinforcement member 26 and the floor pan 22.

The reinforcement member 26 can be formed of an ethylene-vinyl-acetate (EVA) material. The reinforcement member 26 can have a generally L-shaped cross-section. The reinforcement member 26 can be associated with the floor covering 24 by a layer 34, such as an adhesive layer or a heat bonded layer.

The reinforcement member 26 performs the conduit function by being shaped to define an open hollow conduit in combination with the floor pan area 20 and adjacent kick plate body area 22, and optionally the padding material 30. By eliminating a separately installed hollow conduit and by eliminating the need for a special recess to be formed in the floor sheet metal, the assembly process is streamlined, manufacturing costs are reduced, and a part is eliminated.

To make the floor covering 24, a reinforcement member 26 is preformed and laid into a portion of a mold. The floor covering 24 is placed on top of the reinforcement member 26 and heated. The heat and mold pressure forms the floor covering 24 into the desired shape and bonds the reinforcement member 26 to the backing material of the floor covering 24. Alternatively, the reinforcement member 26 can be adhesively secured to the backing material of the floor covering 24 after the floor covering 24 has been formed to the desired shape. It should be recognized that the conduit formed by the combination of the reinforcement member 26, floor plan area 20, and adjacent kick plate body area 22 can be used to route other elongated members in addition to electrical wiring harnesses, such as duct work, fuel lines, HVAV vents or the like. The carpet or aesthetic material can include a backing and pile, and other materials like vinyl, or plastic can be used individually, or in any combination. The color of materials can be selected to complement, match, or harmonize with other interior material colors.

A combination carpet and wire harness protector includes a floor covering 24 and a stiff reinforcement member 26 bonded onto a backing material of the floor covering 24 in an area in which a wiring harness 12 requires protection. The conventional approach uses a separate harness protector to shield and protect the wiring harness, and carpet sits on top of the separate harness protector, which clips into the floor sheet metal or sill sheet metal. An alternative conventional approach uses a recess formed in the floor sheet metal with a planar shield for the recess attached to a side of the padding opposite from the carpet.

In contrast, an embodiment of a combination carpet and wire harness protector as illustrated in FIGS. 1-4 includes a stiff non-planar or contoured reinforcement member 26 bonded onto the floor covering 24 to protect the wiring harness 12. The wiring harness 12 clips to the floor sheet metal 20 or sill sheet metal 22, as conventional in areas not requiring protection. The combination of a floor covering 24 and reinforcement member 26 define a single part acting as a wire harness protector when assembled in combination with the floor sheet metal 20 and kick plate sill sheet metal 22. The combination of floor covering 24 and reinforcement member 26 uses less mass than having a separate wire harness protector. The combination floor covering 24 and reinforcement member 26 save labor costs required to install a separate wire harness protector. The combination floor covering 24 and reinforcement member 26 allows for a more flexible wire harness, which is easier to install. When using a separate wiring harness protector, a gap is required between the protector and the carpet for installation purposes, which can cause a poor fit and finish when applying pressure to the floor covering. The combination floor covering 24 and reinforcement member 26 provides a stiffer construction with better fit and finish characteristics, since the carpet is reinforced, allowing no deformation.

A floor covering product 10 installable for covering at least a portion of a contoured floor pan area 20 of a vehicle 14 for routing an electrical wire harness 12 for a vehicle 14 can include an aesthetic material 24 adapted to be sufficiently coextensive with the contoured floor pan area 20 to be covered, and a contoured reinforcement member 26 having a first side 36 associated with a portion of the aesthetic material 24. After installation, the contoured reinforcement member 26 extends generally upwardly from the floor sheet metal or exposed floor pan area 20 and extends generally toward the adjacent sill sheet metal or kick plate body area 22 to define a crush resistant open conduit 28 for receiving an electrical wire harness 12 to be routed therethrough.

A padding material 30 having a first side 32 engageable with the aesthetic material 24 can be less than coextensive with the aesthetic material 24, such that the padding material 30 defines a portion of the crush resistant open conduit 28 existing between an edge 38 of the padding material 30, the exposed floor pan area 20 and the adjacent kick plate body area 22 for receiving the electrical wire harness 12 to be routed therethrough. The reinforcement member 26 can be formed of ethylene-vinyl-acetate (EVA) material. The reinforcement member 26 can have a generally L-shaped cross-section. The reinforcement member 26 can be associated with the aesthetic material 24 by a layer 34, such as an adhesive layer or a heat bonded layer.

A process for forming a floor covering product 10 for protecting an electrical wiring harness 12 of a motor vehicle 14 routed through a passenger compartment 16 on top of an interior surface 18 of a contoured floor sheet metal or floor pan area 20 with an adjacent sill sheet metal or kick plate body area portion 22 extending generally upwardly along at least a portion of the interior contoured floor pan 20 can include preforming a reinforcement member 26 to a predetermined contoured shape, inserting the contoured preformed reinforcement member 26 into a mold, inserting a floor covering material 24 into the mold with a backing material layer 40 contacting the preformed reinforcement member 26, and heating the mold to form the floor covering material 24 into a predetermined contoured shape. The contoured preformed reinforcement member 26 is associated with the backing material 40 of the floor covering 24 such that when installed the contoured reinforcement member 26 extends generally upwardly from the exposed floor pan area 20 and extends generally toward the adjacent kick plate body area 22 to define a crush resistant open conduit 28 for receiving an electrical wire harness 12 to be routed therethrough.

The process can include engaging a padding material 30 having a first side 32 with the floor covering 24. The padding material 30 can be less than coextensive with the floor covering 24, such that the padding material 30 can define a portion of the crush resistant open conduit 28 existing between an edge 38 of the padding material 30, the exposed floor pan area 20, and the adjacent kick plate body area 22 for receiving an electrical wire harness 12 to be routed therethrough. The process can include forming the reinforcement member 26 of ethylene vinyl-acetate (EVA). The reinforcement member can be formed by the process with a generally L-shaped cross-section. The reinforcement member 26 can be associated with the floor covering 24 by a layer 34, such as an adhesive layer or a heat bonded layer. The process of heating the mold to form the floor covering 24 can simultaneously associate the preformed reinforcement member 26 to the floor covering 24 with a heat bonded layer 34.

A floor covering product or assembly 10 made by the process can be installed for covering at least a portion of a contoured floor pan area 20 of a vehicle 14 for routing an electrical wire harness 12 for the vehicle 14. The assembly can include an aesthetic material 24 adapted to be sufficiently coextensive with the contoured floor pan area 20 to be covered, and a contoured reinforcement member 26 having a first side 36 associated with a portion of the aesthetic material 24, such that after installation the contoured reinforcement member extends generally upwardly from the exposed floor pan area 20 and extends inwardly toward the adjacent kick plate body area 22 to define a crush resistant open conduit 28 for receiving an electrical wire harness 12 to be routed therethrough.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A covering product installable for covering at least a portion of a sheet metal area of a vehicle for routing a harness in the vehicle, the product comprising:
   an aesthetic material adapted to be sufficiently coextensive with the sheet metal area to be covered; and
   a contoured reinforcement member associated with and supporting a portion of the aesthetic material, such that after installation, the contoured reinforcement member extends along the sheet metal area beneath the aesthetic material and transitions away from the sheet metal area and toward an adjacent sheet metal side portion to form a portion of a crush resistant open conduit, wherein remaining portions of the crush resistant open conduit are formed by a portion of the sheet metal area and the adjacent sheet metal side portion in an area adjacent the transition, the crush resistant open conduit for receiving the harness therethrough.

2. The covering product of claim 1 further comprising:
   a padding material having a first side engageable with the aesthetic material and being less than coextensive with the aesthetic material, such that the padding material defines the remaining portions of the crush resistant open conduit in addition to the portion of the sheet metal area and the adjacent sheet metal side portion in the area adjacent the transition.

3. The covering product of claim 1, wherein the reinforcement member is formed of ethylene-vinyl-acetate (EVA).

4. The covering product of claim 1, wherein the reinforcement member comprises a first portion that extends along the sheet metal area and a second portion angled with respect to the first portion to extend toward the adjacent sheet metal side portion.

5. The covering product of claim 4, wherein the second portion of the contoured reinforcement member is associated with the aesthetic material thereby providing increased support for the crush resistant open conduit.

6. The covering product of claim 1, wherein the contoured reinforcement member is a preformed reinforcement member comprising a first portion and a second portion in a non-coplanar arrangement.

7. The covering product of claim 6, wherein the preformed reinforcement member, when associated with the aesthetic material, forms an interior corner of the vehicle.

8. The covering product of claim 1, wherein the harness is at least one of electrical wiring, an electrical harness, an HVAC vent, a fuel line and a duct.

9. The covering product of claim 1, wherein the reinforcement member is associated with the aesthetic material by an adhesive layer.

10. The covering product of claim 1, wherein the reinforcement member is associated with the aesthetic material by a heat bonded layer.

11. The covering product of claim 1, wherein the sheet metal area and the adjacent sheet metal side portion are sheet metal.

12. The covering product of claim 1 wherein the aesthetic material is a carpet and wherein the vehicle body area to be covered is at least a portion of a floor area of the vehicle.

13. The covering product of claim 2, wherein the reinforcement member comprises a horizontal edge portion positioned between the aesthetic material and the padding material.

14. The covering product of claim 1, wherein the reinforcement member comprises a substantially planar portion positioned between the aesthetic material and the adjacent sheet metal side portion.

* * * * *